United States Patent [19]

Kitamura et al.

[11] Patent Number: 5,197,145
[45] Date of Patent: Mar. 23, 1993

[54] BUFFER STORAGE SYSTEM USING PARALLEL BUFFER STORAGE UNITS AND MOVE-OUT BUFFER REGISTERS

[75] Inventors: Yoshimoto Kitamura, Tokyo; Seishi Okada, Kawasaki, both of Japan

[73] Assignee: Fujitsu Limited, Kawasaki, Japan

[21] Appl. No.: 409,711

[22] Filed: Sep. 20, 1989

[30] Foreign Application Priority Data

Sep. 20, 1988 [JP] Japan ............................ 63-233702

[51] Int. Cl.⁵ .............................................. G06F 13/28
[52] U.S. Cl. ................................ 395/425; 364/DIG. 1; 364/212.3; 364/238.6; 364/239
[58] Field of Search ............... 395/400, 425, DIG. 1, 395/DIG. 2; 364/200 MS File; 900 MS File

[56] References Cited

U.S. PATENT DOCUMENTS

| | | | |
|---|---|---|---|
| 4,092,713 | 4/1978 | Scheuneman | 364/200 |
| 4,707,784 | 11/1987 | Ryan et al. | 364/200 |
| 4,736,293 | 4/1988 | Patrick | 364/200 |
| 4,823,259 | 4/1989 | Aichelmann et al. | 364/200 |
| 4,831,622 | 5/1989 | Porter et al. | 371/10 |
| 4,905,188 | 2/1990 | Chuang et al. | 364/900 |

FOREIGN PATENT DOCUMENTS 64-23354  1/1989  Japan .

OTHER PUBLICATIONS

Taniguchi et al., "ADPCM with a Multiquantizer for Speech Coding", IEEE Journal on Selected Areas in Communications vol. 6, No. 2, Feb. 1988.

Primary Examiner—Joseph L. Dixon
Assistant Examiner—Rebecca L. Rudolph
Attorney, Agent, or Firm—Staas & Halsey

[57] ABSTRACT

A buffer storage system provided between an instruction executing portion and a main storage for enabling the instruction executing portion to quickly fetch and store date in a frequently-accessed address area. The buffer storage system includes a plurality of buffer storages each storing the same data; and a move-out buffer register provided between the plurality of buffer storages and the main storage. When data held in the buffer storages is required to be moved out to the main storage, a part of the data to be moved out is transferred from each of the plurality of buffer storages to a corresponding portion of the move-out buffer register, and then the data is transferred from the move-out buffer register to the main storage. The transferring of the parts of the data from the plurality of buffer storages to the corresponding portions of the move-out buffer register are concurrently carried out, and the parts of the data concurrently transferred from all of the buffer storages to the move-out buffer register constitute the whole of the data to be moved out.

13 Claims, 7 Drawing Sheets

BUFFER STORAGE SYSTEM USING PARALLEL BUFFER STORAGE UNITS AND MOVE-OUT BUFFER REGISTERS

BACKGROUND OF THE INVENTION (1) Field of the Invention

The present invention relates to a buffer storage system provided between an instruction executing portion and a main storage to enable fast fetching and storing of data in a frequently-accessed address area by the instruction executing portion. The present invention relates, in particular, to a buffer storage system wherein a write-back (store-in) mechanism is used to maintain identity between the contents of the buffer storage and the corresponding portion of the main storage.

In many computer systems, a buffer storage system (cache memory system) comprising a relatively small capacity and fast but high-cost memory device is provided between an instruction executing portion in a central processing unit and a main storage to enable fast fetching and storing of data in a frequently-accessed address area by the instruction executing portion.

Generally, in the above-mentioned buffer storage, copies of the contents of a plurality of block areas of the main storage are stored because data fetching and storing operations are often carried out successively in the same address area by the instruction executing portion, and because operations of searching the address of required data in the buffer storage is rather easy when data is stored in blocks.

When data required in the central processing unit is found in the buffer storage (i.e., when a cache hit occurs), the data stored in the buffer storage is fetched by the instruction executing portion. However, when data required in the central processing unit is not found in the buffer storage (when a miss hit occurs), a new block of data which contains the required data is transferred (move-in) from the main storage to the buffer storage.

There are two methods of storing data in the main storage. One is called a write-through method, and the other is called the above-mentioned write-back (store-in) method.

In the write-through method, every storage operation in the buffer storage is immediately repeated in the corresponding portion of the main storage. On the other hand, in the write-back (store-in) method, when a hit occurs in an address searching operation for a data storing operation, the content of the buffer storage is renewed by the instruction executing portion in the central processing unit, and the corresponding content of the main storage is left as before the renewing operation of the buffer storage. Further, the renewal of the content of the main storage corresponding to the renewed data in the buffer storage is carried out just before the block containing the stored data in the buffer storage is replaced by a copy of the other block in the main storage.

According to the above-mentioned write-back method, the above replacement of a block in the buffer storage is carried out as follows.

As mentioned before, when a miss hit occurs in the buffer storage, a copy of a new block containing required data in the main storage must be written in an area of the buffer storage. When no vacant area exists in the buffer storage, the above copy of the new block is over-written in the area in which the other block data has been stored in the buffer storage.

Since, in the write-back method, the renewed content in the block area to be replaced by the other block data from the main storage is not written in the corresponding block area in the main storage, the content of the block area to be replaced must be transferred (moved-out) from the buffer storage to the main storage before the new data block is written in the area in the buffer storage.

(2) Description of the Related Art

FIG. 1 shows an outline of the construction for carrying out the moving-out operation in the conventional buffer storage system.

In FIG. 1, reference numeral 5 denotes a buffer storage, 6 denotes a move-out buffer register, and 20 denotes an address register.

In the buffer storage 5, a plurality of blocks of data wherein each of the blocks consists of, for example, 64 bytes, are stored. When a block of data is moving-out from the buffer storage 5, one line of data in the block, where one line consists of eight bytes of data, is transferred from the buffer storage 5 to the move-out buffer register 6 in one cycle. Namely, the transferring operation of one line must be carried out eight times for moving-out the whole block.

The move-out buffer register 6 is provided as a buffer between the buffer storage side and the main storage side, and has a capacity corresponding to at least one block, i.e., 64 bytes in the example of FIG. 1.

In the construction for carrying out the moving-out operation in the conventional buffer storage system as shown in FIG. 1, however, the instruction executing portion cannot carry out a data fetch operation in the buffer storage until the operation of the replacement of the block including the above moving-out operation is completed. Therefore, it is required to reduce the time necessary for carrying out the moving-out operation.

SUMMARY OF THE INVENTION

An object of the present invention is to provide a buffer storage system wherein the time necessary for carrying out the moving-out operation can be reduced.

According to the present invention, there is provided a buffer storage system between a main storage and an instruction executing portion, where the instruction executing portion fetches data consisting of instructions and operands and executes the instructions, the buffer storage system includes a plurality of buffer storages each storing the same data consisting of instructions and operands; and a move-out buffer register unit being provided between the plurality of buffer storages and the main storage. A part of the data which is required to be moved out is transferred from each of the plurality of buffer storages to a corresponding portion of the move-out buffer register unit, and then the data is transferred from the move-out buffer register unit to the main storage when the data held in the buffer storages is required to be moved out to the main storage. In the above construction, the transfers of the parts of the data from the plurality of buffer storages to the corresponding portions of the move-out buffer register unit are concurrently carried out, and the parts of the data concurrently transferred from all of the buffer storages constitute the whole of the data required to be moved out.

DESCRIPTION OF THE PREFERRED EMBODIMENTS

Before describing the preferred embodiment of the present invention, the basic principle of the present invention is explained below.

Figure 2:
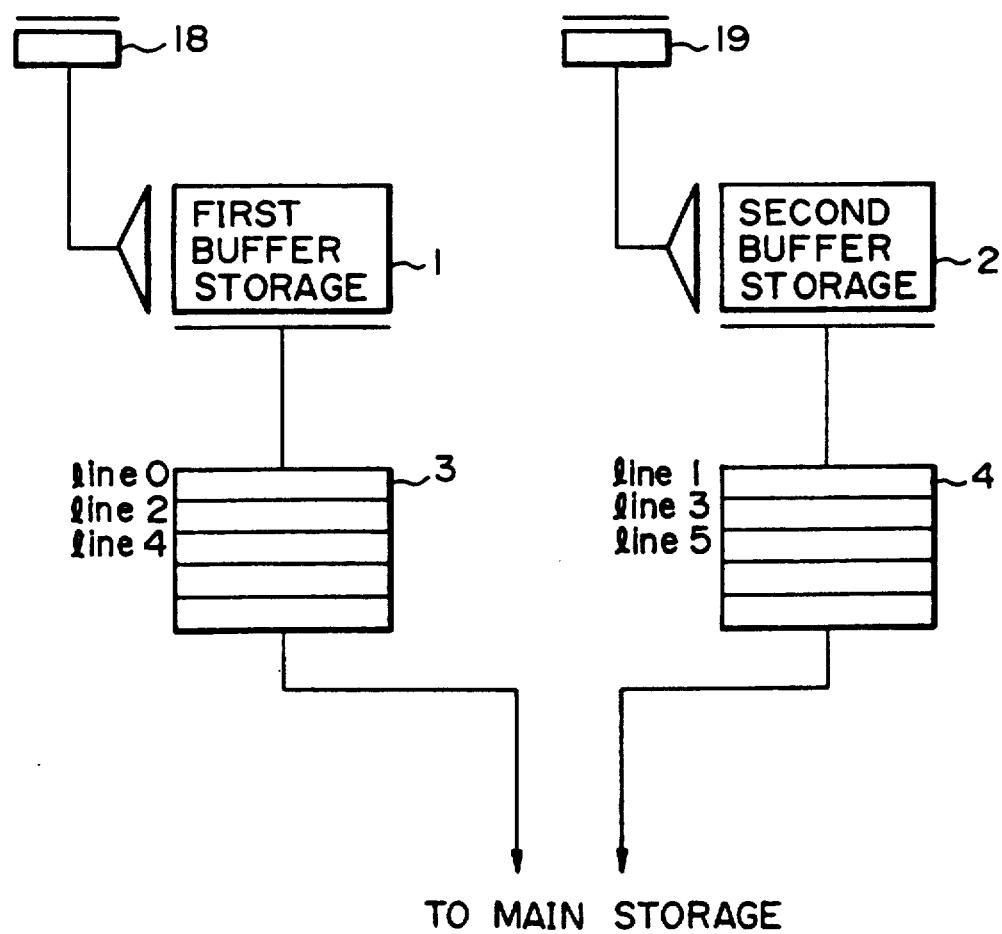
FIG. 2 is a block diagram of a basic construction of the present invention.

FIG. 2 shows a basic construction of the present invention.

In FIG. 2, reference numerals 1 and 2 denote first and second buffer storages, 3 and 4 denote first and second move-out buffer registers, and 18 and 19 each denote an address register.

The number of buffer storages (and accordingly, the number of move-out buffer registers) is generally an arbitrary positive integer according to the present invention, although the number of the buffer storages shown in FIG. 2 is two as a typical example for explanation. In addition, as an alternative, the above move-out buffer registers may be replaced with a single buffer register having the above number of portions where moved-out data from the buffer storages can be concurrently or simultaneously written in the portions, i.e., having a plurality of concurrently writable data input ports.

A plurality of buffer storages 1 and 2 are each operated according to the aforementioned write-back method.

The plurality of buffer storages 1 and 2 each store the same data consisting of instructions and operands. Move-out buffer registers 3 and 4 are provided between the plurality of buffer storages 1 and 2 and the main storage.

A part of data required to be moved out is transferred from each of the plurality of buffer storages 1 and 2 to a corresponding one of the move-out buffer registers 3 and 4, and then the data is transferred from the move-out buffer registers 3 and 4 to the main storage, when the data held in the buffer storages 1 and 2 is required to be moved out to the main storage.

In the above construction, the transfers of the parts of the data from the plurality of buffer storages 1 and 2 to the corresponding move-out buffer registers 3 and 4 are concurrently carried out. Further, the parts of the data concurrently transferred from all of the buffer storages 1 and 2 to the move-out buffer registers 3 and 4 constitute the whole of the data required to be moved out.

For example, the above-mentioned part of data may be 1/n of the data to be moved out when the number of buffer storages is n.

In the example shown in FIG. 2, halves of a data block a first half including even-numbered lines 0, 2, 4, ..., and a second half including odd-numbered lines 1, 3, 5, ..., are moved out from the buffer storages 1 and 2 to the move-out buffer registers 3 and 4. Note the odd-numbered lines in the block stored in the first buffer storage 1 and the even-numbered lines in the block stored in the second buffer storage are not read out in the operation according to the present invention.

Figure 1:
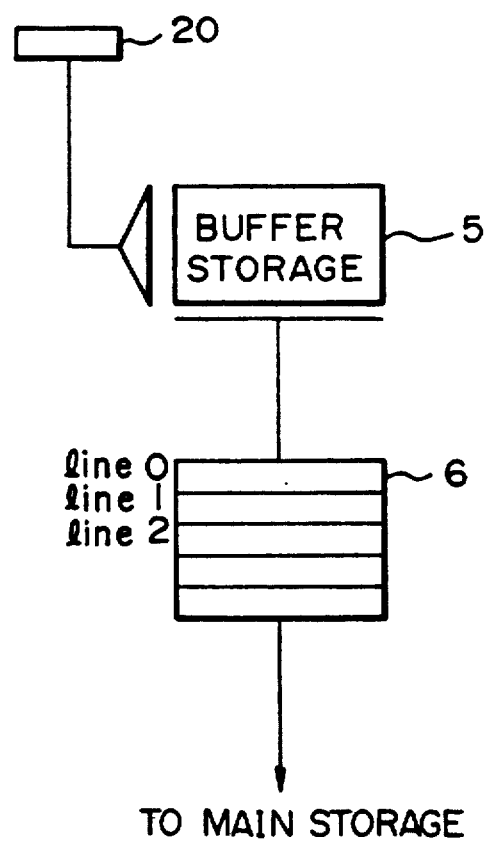
FIG. 1 is a block diagram of the construction for carrying out the moving-out operation in the conventional buffer storage system.

Therefore, the time necessary for completing the move-out operation in the construction shown in FIG. 2 is reduced by a factor of one-half of the time necessary in the aforementioned conventional buffer storage system as shown in FIG. 1 when the above number of the buffer storages is two. Further, the time necessary for completing the move-out operation can be reduced to 1/n of the conventional buffer storage system when the number of the buffer storages is n.

Figure 3:
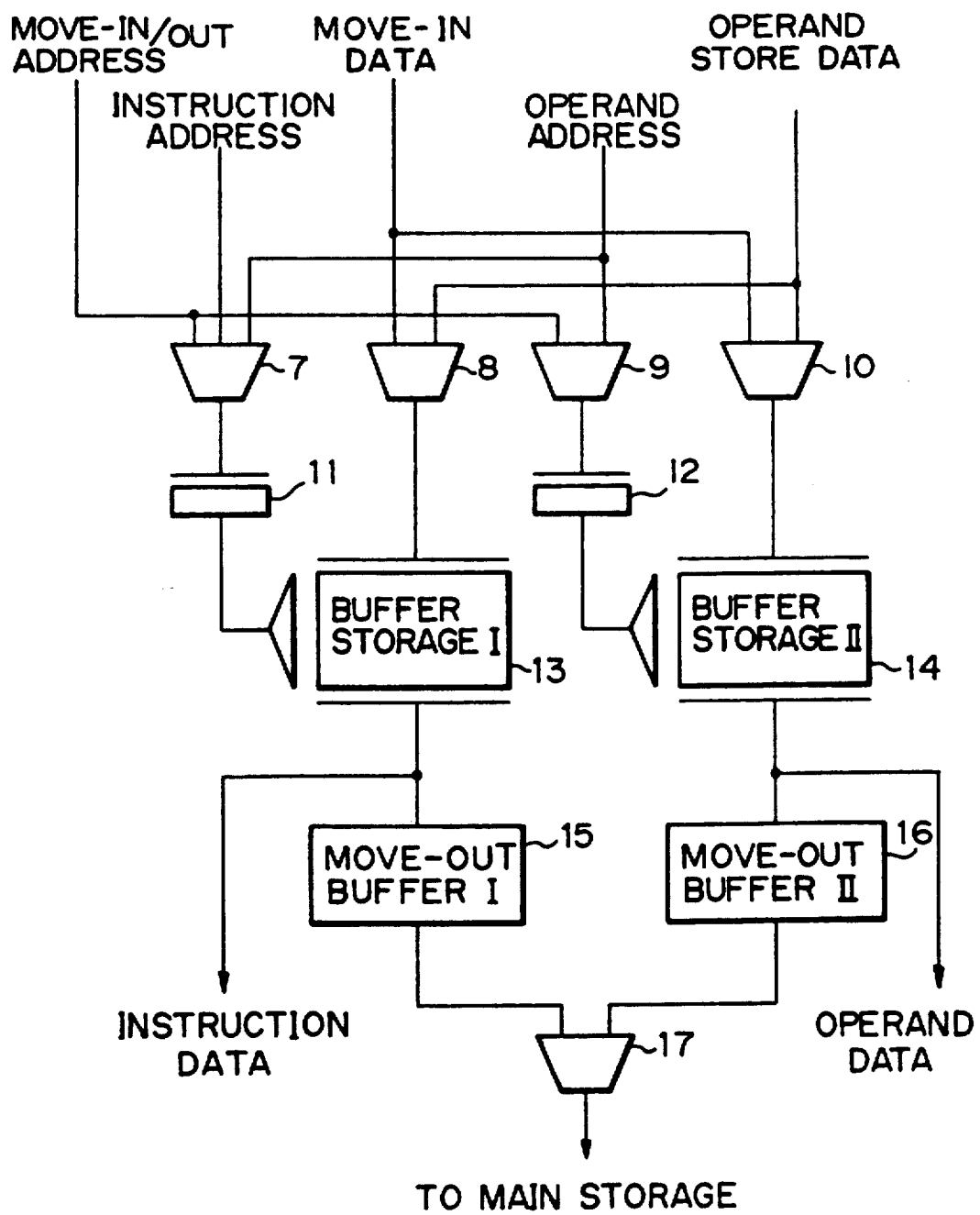
FIG. 3 is a block diagram of the first embodiment of the present invention.

FIG. 3 shows the construction of the first embodiment of the present invention.

In FIG. 3, reference numeral 7, 8, 9, 10, and 17 each denote a selector, 11 and 12 each denote an address register, 13 and 14 each denote a buffer storage, 15 and 16 each denote a move-out buffer register.

In the construction of FIG. 3, the buffer storages 13 and 14 each correspond to the first and second buffer storages 1 and 2 in FIG. 2, respectively, and the move-out buffer registers 15 and 16 each correspond to the first and second move-out buffer registers 3 and 4 in FIG. 2, respectively. Namely, the move-out operations carried out in the construction of FIG. 3 are the same as FIG. 2.

The selector 7 receives an instruction address, an operand address, a move-in address, and a move-out address. The output of the selector 7 is applied to the address input terminal of the buffer storage 13 through the address register 11.

The selector 9 receives the operand address, the move-in address, and the move-out address. The output of the selector 9 is applied to the address input terminal of the buffer storage 14 through the address register 12.

Both the selectors 8 and 10 receive operand store data, and move-in data. The output of the selector 8 is applied to the data input terminal of the buffer storage 13, and the output of the selector 10 is applied to the data input terminal of the buffer storage 14.

The instruction address is applied to the selector 7 when the instruction executing portion (not shown) accesses the buffer storage 13 for an instruction fetch, and the operand address is applied to both the selectors 7 and 9 when the instruction executing portion accesses the buffer storage 14 for an operand fetch, and when the instruction executing portion accesses both the buffer storages 13 and 14 for storing an operand data (the above input of the selector 7 is not selected when the instruction execution portion accesses the buffer storage 14 for an operand fetch). The operand storing operation is carried out in both the buffer storages 13 and 14 to maintain the identity of the contents of both the buffer storages 13 and 14.

In the construction of FIG. 3, when the instruction executing portion (not shown) accesses the buffer storages 13 and 14, the buffer storage 13 is used as an instruction buffer storage which conventionally stores instruction data only, and the buffer storage 14 is used as an operand buffer storage which conventionally stores operand data only, although both the buffer storages 13 and 14 store the same data including the instruction data and the operand data according to the present invention. This is the reason the above instruction address is applied to the selector 7 only.

Further, the reason for the above usage by the instruction executing portion is because usually operand fetch operations follow an instruction fetch operation, and the above provision of the instruction buffer storage and the operand buffer storage facilitates pipeline processing of instructions.

The instruction data output from the buffer storage 13 is supplied to the instruction executing portion in the central processing unit in the instruction fetch operation, and the operand data output from the buffer storage 14 is supplied to the instruction executing portion in the central processing unit in the operand fetch operation.

The aforementioned move-in operation is carried out by applying the move-in address(es) to both the selectors 7 and 9 and applying the move-in data, which is transferred from the main storage to both the buffer storages 13 and 14 after the move-out operation.

In the move-out operation, the move-out address(es) for moving-out half of the data which is required to be moved-out from the buffer storage 13 (for example, the aforementioned lines 0, 2, 4, . . . ) is (are) input into the address register 11 through the selector 7 and the move-out address(es) for moving-out the other half of the data required to be moved-out from the buffer storage 14 (for example, the aforementioned lines 1, 3, 5, . . . ) is (are) input into the address register 12 through the selector 9; Therefore, the above halves of the data are each read out from the buffer storages 13 and 14, respectively and concurrently, according to the address(es) concurrently (and successively) supplied from the corresponding address registers 11 and 12.

The above data read out (moved-out) from the buffer storages 13 and 14 are each written in the corresponding move-out buffer registers 15 and 16, respectively; The data are then alternatively read out from the move-out buffer registers 15 and 16 through the selector 17 to the main storage.

Through all the above explanations, it is assumed that the output of each selector is controlled to select the input which is mentioned in the corresponding paragraph.

Figure 4:
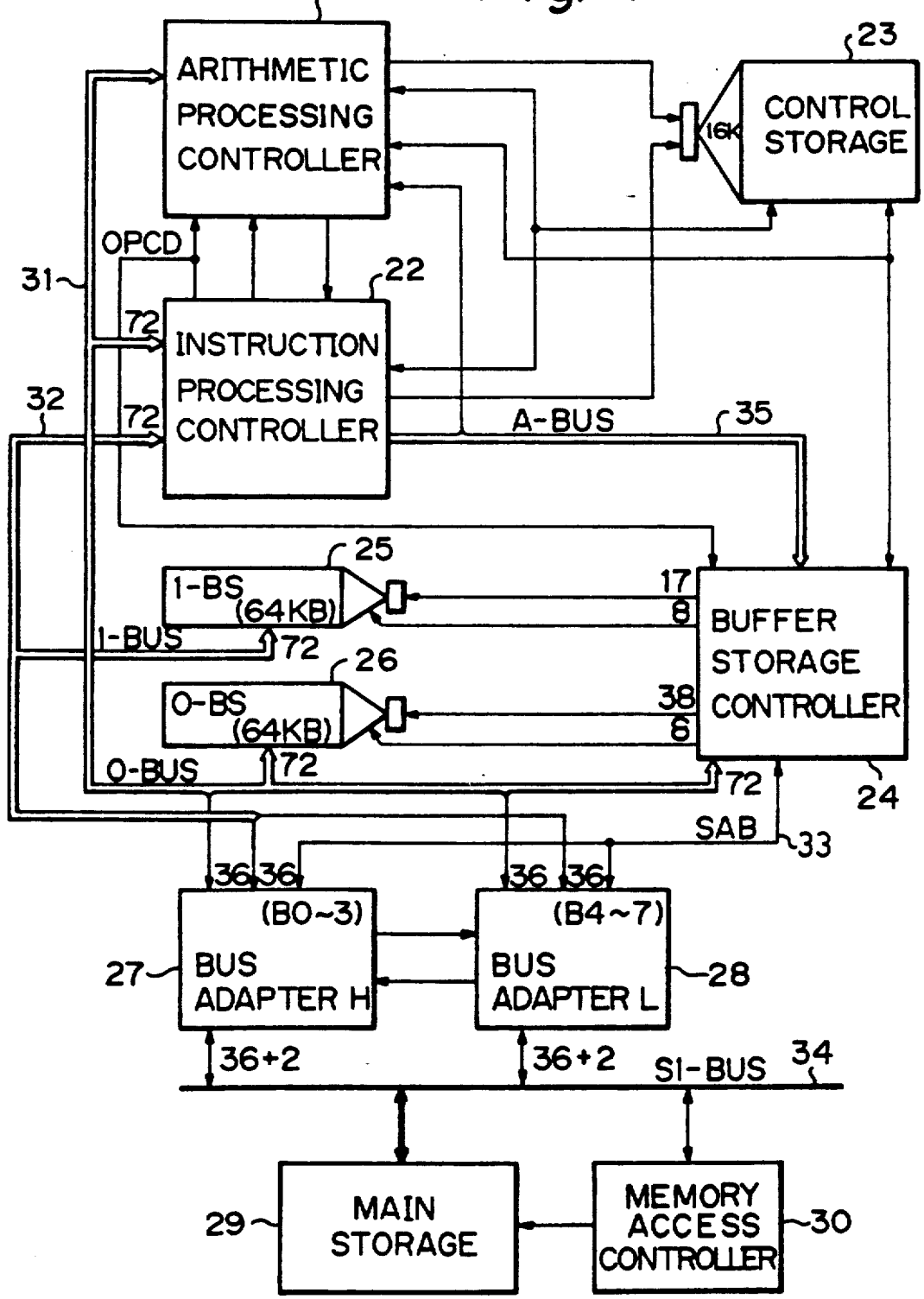
FIGS. 4 and 5 are block diagrams of the construction of the second embodiment of the present invention.
Figure 5:
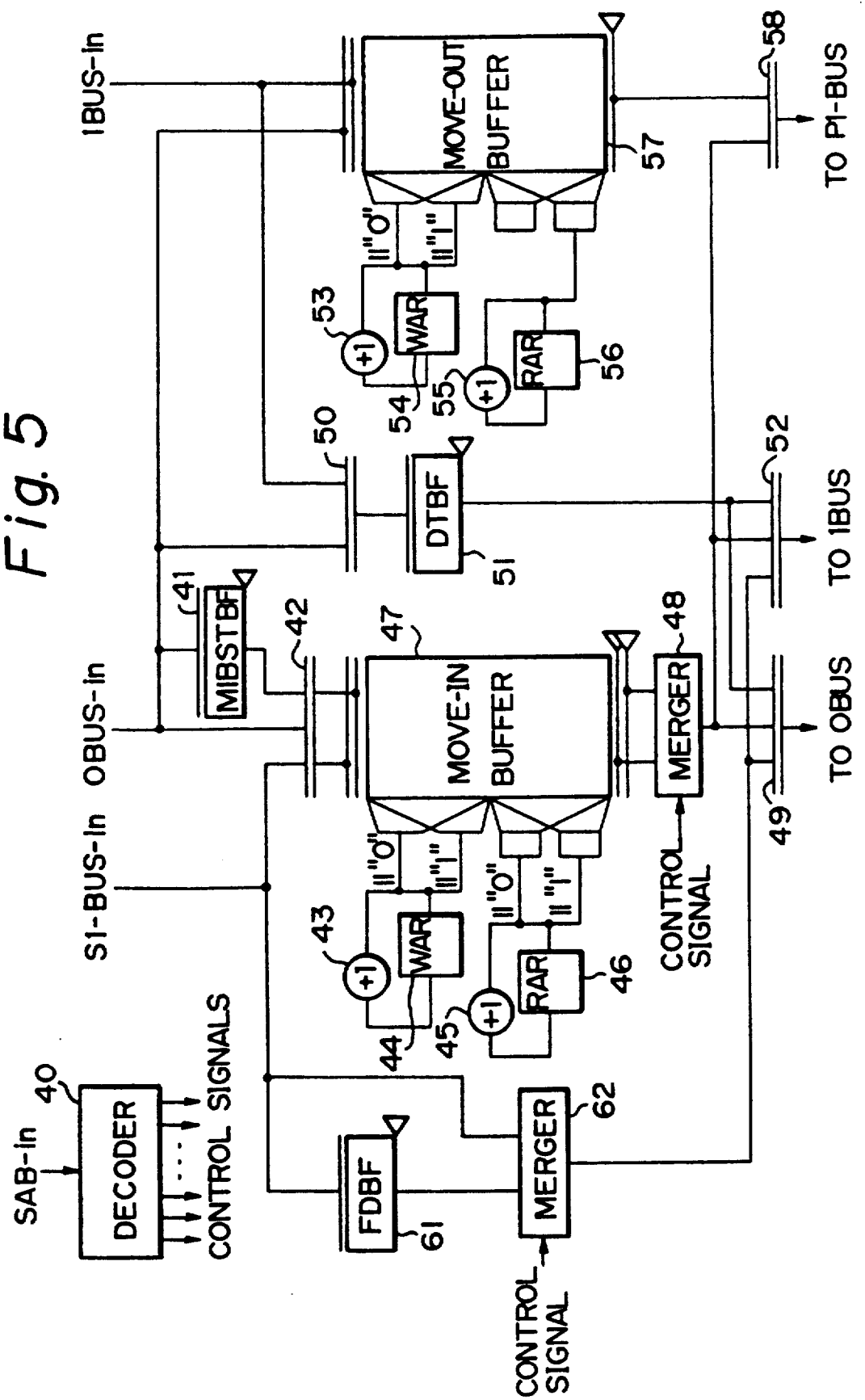

FIGS. 4 and 5 show the construction of the second embodiment of the present invention.

FIG. 4 shows the outline of the construction of the central processing unit which contains the buffer storage system as the second embodiment of the present invention.

In FIG. 4, reference numeral 21 denotes an arithmetic processing controller, 22 denotes an instruction processing controller, 23 denotes a control storage, 24 denotes a buffer storage controller, 25 denotes an I-buffer storage, 26 denotes an O-buffer storage, 27 denotes a bus adapter H, 28 denotes a bus adapter L, 29 denotes a main storage, 30 denotes a memory access controller, 31 denotes an O-bus, 32 denotes an I-bus, 33 denotes a storage access bus, 34 denotes a system bus (SI-bus), and 35 denotes an access bus.

In the construction of FIG. 4, the control storage 23 stores a microprogram, and microinstructions in the microprogram are output to the instruction processing controller 22, the arithmetic processing controller 21, and the buffer storage controller 24, according to addresses applied from the instruction processing controller 22 and the arithmetic processing controller 21 to the address input port of the control storage 23.

The instruction processing controller 22 executes instructions, which are fetched from the I-buffer storage 25 through the I-bus 32, under the control of the microinstructions and using the arithmetic processing controller 21 for arithmetic calculation when necessary for executing the instructions. In addition, the instruction processing controller 22 fetches operands from the O-buffer storage 26 through the O-bus 31.

The arithmetic processing controller 21 carries out arithmetic calculation using operand data read out from the O-buffer storage 26 and supplied from the instruction processing controller 22 under the control of the instruction processing controller 22 and the microinstructions.

The I-buffer storage 25 and the O-buffer storage 26 each correspond to the aforementioned buffer storages 13 and 14 in FIG. 3, respectively; Therefore, the same data including instruction data and operand data is stored in both the I-buffer storage 25 and the O-buffer storage 26.

The buffer storage controller 24 controls all the operations regarding memory access by the instruction processing controller 22 under the control of the instruction processing controller 22 and the microinstructions.

In particular, the buffer storage controller 24 supplies control signals and all kinds of addresses, including the addresses as mentioned in the explanation of the first embodiment of FIG. 3, to the I-buffer storage 25 and the O-buffer storage 26.

For example, when the buffer storage controller 24 receives a request for an access to the memory and a corresponding address from the instruction processing controller 22 through the access bus 35, it searches for a matching address (tag) in the addresses (tags) of the data stored in the buffer storages 25 or 26, and determines whether a hit or a miss hit occurs.

When a hit occurs, the buffer storage controller 24 controls the I-buffer storage 25 or the O-buffer storage 26 by supplying the control signals and the above address so that the instruction processing controller 22 can access the I-buffer storage 25 or the O-buffer storage 26.

When a miss hit occurs, the buffer storage controller 24 controls a necessary move-out operation and a move-in operation following the move-out operation by controlling the I-buffer storage 25, the O-buffer storage 26, the bus adapter H 27, the bus adapter L 28, and the memory access controller 30.

The bus adapter H 27 and the bus adapter L 28 generally functions as an interface between the side of the instruction processing controller 22, the I-buffer storage 25 and the O-buffer storage 26, and the side of the main storage 29. The above-mentioned move-out and move-in operations are carried out through the bus adapter H 27 and the bus adapter L 28.

The construction corresponding to the aforementioned move-out buffer registers is realized in the bus adapter H 27 and the bus adapter L 28 as explained later with reference to FIG. 5.

The above construction corresponds to the central processing unit. The main storage 29 and the memory access controller 30 are connected to the central processing unit through the system bus (SI-bus) 34. The memory access controller 30 controls the input and output operations of the main storage 29.

FIG. 5 shows the construction of the portions pertaining to the move-out operations and the move-in operations, in the bus adapter H 27 or the bus adapter L 28 in the second embodiment of the present invention. Namely, the construction shown in FIG. 5 is contained in each of the bus adapter H 27 and the bus adapter L 28.

In FIG. 5, reference numeral 40 denotes a decoder, 41 denotes a move-in buffer storage buffer, 42, 49, 50, 52, and 58 each denote a selector, 43, 45, 53, and 55 each denote an adder, 44 and 54 each denote a write address register, 46 and 56 each denote a read address register, 47 denotes a move-in buffer memory, 48 and 62 each denote a merger, 51 denotes a data buffer register, 57 denotes a move-out buffer memory, and 61 denotes a fetch data buffer register.

In FIG. 5, the construction corresponding to the aforementioned move-out buffer register is the move-out buffer memory 57. The manner of data input and output in the move-out buffer memory 57 in FIG. 5 (which is provided in each of the bus adapter H 27 and the bus adapter L 28) is a little different from the move-out buffer register 15 or 16. The move-out buffer memory 57 is a RAM having two input ports through which ports two data each having a width of four bytes can be written independently, and therefore, simultaneously.

Figure 6:
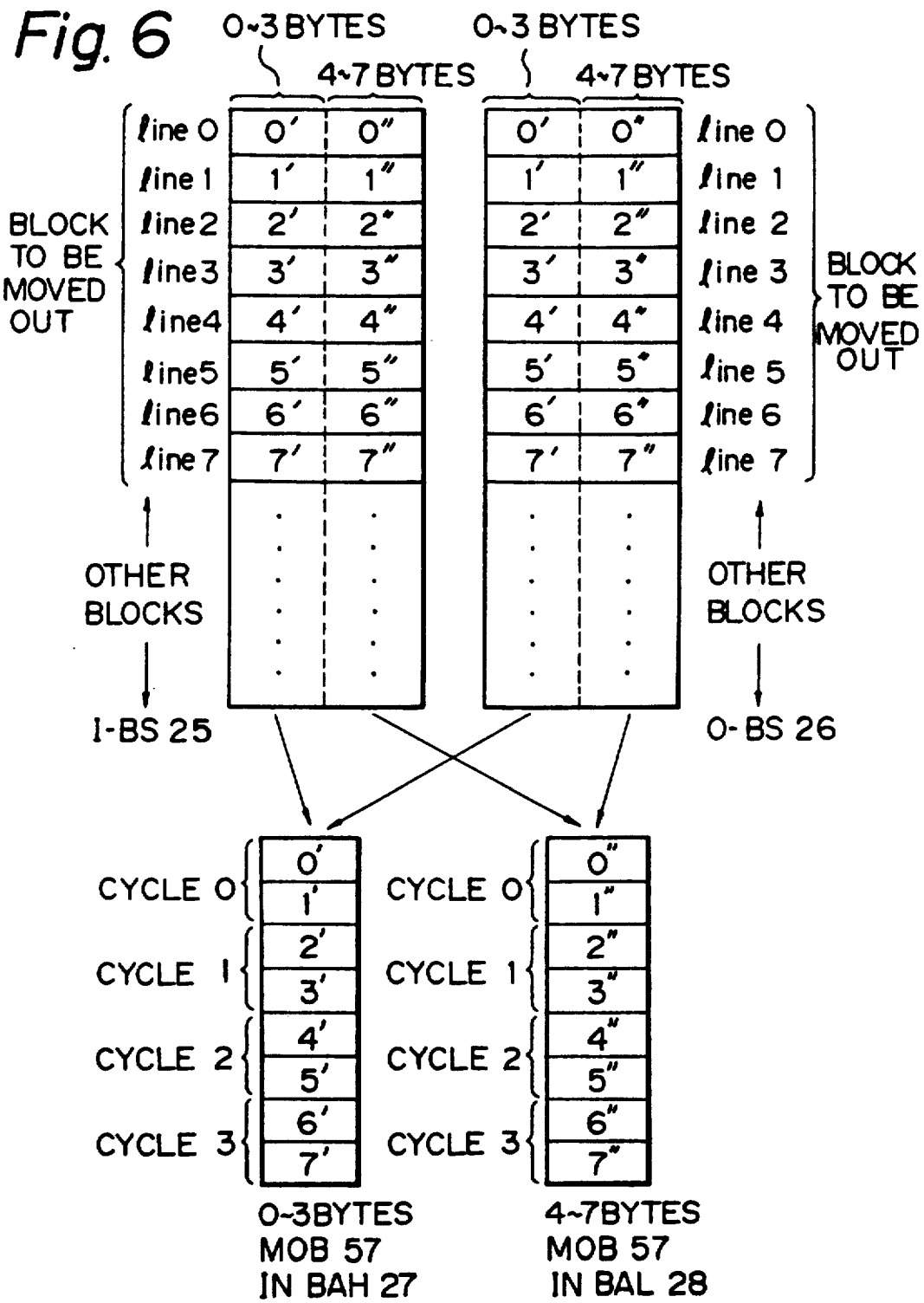
FIG. 6 is a diagram illustrating the data transfers carried out in a move-out operation in the second embodiment of the present invention.

FIG. 6 shows data transfers from the I-buffer storage 25 and the O-buffer storage 26 to the move-out buffer memories 57 in the bus adapter H 27 and the bus adapter L 28, which are carried out in the move-out operation in the second embodiment of the present invention.

In FIG. 6, reference numeral k' (k=0 to 7) denotes the data portion corresponding to the 0th to the 3rd bytes in the k-th line which are doubly stored in both the I-buffer storage 25 and the O-buffer storage 26, and reference numeral k" (k=0 to 7) denotes the data portion corresponding to the 4th to the 7th bytes in the k-th line which are doubly stored in both the I-buffer storage 25 and the O-buffer storage 26.

The width of input or output data in the I-buffer storage 25 and the O-buffer storage 26 are each eight bytes (one line), and each block consists of eight lines.

As shown in FIG. 6, the data portion corresponding to the 0th to the 3rd bytes in even-numbered lines stored in the I-buffer storage 25, and the data portion corresponding to the 0th to the 3rd bytes in odd-numbered lines stored in the 0-buffer storage 26 are respectively and simultaneously transferred to the even-numbered and odd-numbered entries (each having a width of four bytes) of the move-out buffer memory 57 in the bus adapter H 27. The data portion corresponding to the 4th to the 7th bytes in even-numbered lines stored in the I-buffer storage 25, and the data portion corresponding to the 4th to the 7th bytes in odd-numbered lines stored in the O-buffer storage 26 are respectively and simultaneously transferred to the even-numbered and odd-numbered entries (each having a width of four bytes) of the move-out buffer memory 57 in the bus adapter L 28.

Namely, two lines are read out simultaneously from the I-buffer storage 25 and the O-buffer storage 26, and the lines are then simultaneously written in the move-out buffer memories 57 in the bus adapter H 27 and the bus adapter L 28. Thus, the time necessary to complete the move-out operation of one block is four cycles (the cycles 0 to 3 shown in FIG. 6), which is half the time necessary to complete the move-out operation of one block in the construction of FIG. 1.

Returning to FIG. 5, the move-out buffer memory 57 has two input ports each being connected to the I-bus 32 and the O-bus 31, respectively and correspondingly. Further, the move-out buffer memory 57 has two write address input ports, wherein one of the lowest columns (least significant bits) of the two binary addresses applied to the two write address input ports is fixed to "0" and the other one of the lowest columns is fixed to "1", each corresponding to the even-numbered entries and the odd-numbered entries of the move-out buffer memories 57 in the bus adapter H 27 and the bus adapter L 28. The values of the higher columns (the more significant bits) of the two binary addresses are generated by the loop made by the write address register 54 and the adder 53 where the output of the write address register 54 is incremented each cycle (each timing of a data transfer). Thus, the address values "0" and "1" are each applied to the corresponding write address input port of the move-out buffer memories 57 in the bus adapter H 27 and the bus adapter L 28 at the cycle 0, "2" and "3" each are applied to the ports at the cycle 1, etc.

Although the move-out buffer memory 57 has two independent data output ports and corresponding two read address input ports, only one port is used to transfer its content to the main storage 29. Therefore, the read address register 56 outputs all (three) bits as a read address, and the read address is incremented by the adder 55 at each cycle (each cycle of four-bytes data transfer to the main storage 29 through the system bus (SI-bus) 34).

The other portions of the construction shown in FIG. 5 are explained below.

The selector 50 and the data buffer register 51 are provided for making a data path from the O-bus 31 to the I-bus 32 through the selector 50, the data buffer register 51, and the O-bus 49. The fetch data buffer register 61 and the merger 62 are provided for carrying out a merging operation, i.e., combining a continuous end portion of one line of data to a continuous beginning portion of the succeeding line of data to make a continuous combination of the above two portions in one line. To carry out the above operation, a first line of data transferred from the main storage 29 through the system bus (SI-bus) 34 is held in the fetched data buffer register 61, the output of the fetched data buffer register 61 is applied to the merger 62, and the succeeding line of data transferred from the main storage 29 through the system bus (SI-bus) 34 is directly applied to the merger 62.

The output of the merger 62 is transferred to the I-buffer storage 25 through the selector 52 and the I-bus 32, and to the O-buffer storage 26 through the selector 51 and the O-bus 31.

The construction of the selector 42, the move-in buffer memory 47, and the merger 48, where the input of the construction is connected to the system bus (SI-bus) 34 and the output is connected both the selectors 49 and 52, is provided for carrying out a move-in operation.

The move-in buffer memory 47 can be realized by the same type of RAM as the move-out buffer memory 57 having two independent input ports and two independent output ports. Both the construction for generating the write addresses applied to the two write address input ports comprising the write address register 44 and the adder 43, and the construction for generating read addresses applied to two read address input ports comprising the read address register 46 and the adder 45, are similar to the aforementioned construction for generating write addresses applied to two write address input ports comprising the write address register 54 and the adder 53 in the move-out buffer memory 57.

The outputs through the two output ports of the move-in buffer memory 47 are applied to the merger 48.

The function of the merger 48 is the same as the aforementioned functions of the merger 62. The output of the merger 48 is applied to both the input terminals of the selectors 49 and 52, which lead the O-bus 31 and the I-bus 32, respectively.

Thus, a block of data transferred from the main storage 29 through the system bus (SI-bus) 34 is moved-in through the path of the selector 42, the move-in buffer memory 47, the merger 48, and both the selectors 49 and 52, to both the I-buffer storage 25 and the O-buffer storage 26.

The move-in buffer storage buffer 41 is provided for storing data from the instruction processing controller 22 when a block which contains the address of the data required to be stored is still in the move-in operation. The data held in the move-in buffer storage buffer 41 is written on the move-in buffer memory 47 after the completion of the transfer of the block data from the main storage 29 to the move-in buffer memory 47.

The control signals for controlling all the above construction of FIG. 5 can be generated in the decoder 40, which is provided in each of the constructions of bus adapter H 27 and the bus adapter L 28. The control signals are generated by decoding a storage access command and storage access address supplied from the buffer storage controller 24 in FIG. 4 through the storage access bus 33.

Figure 7:
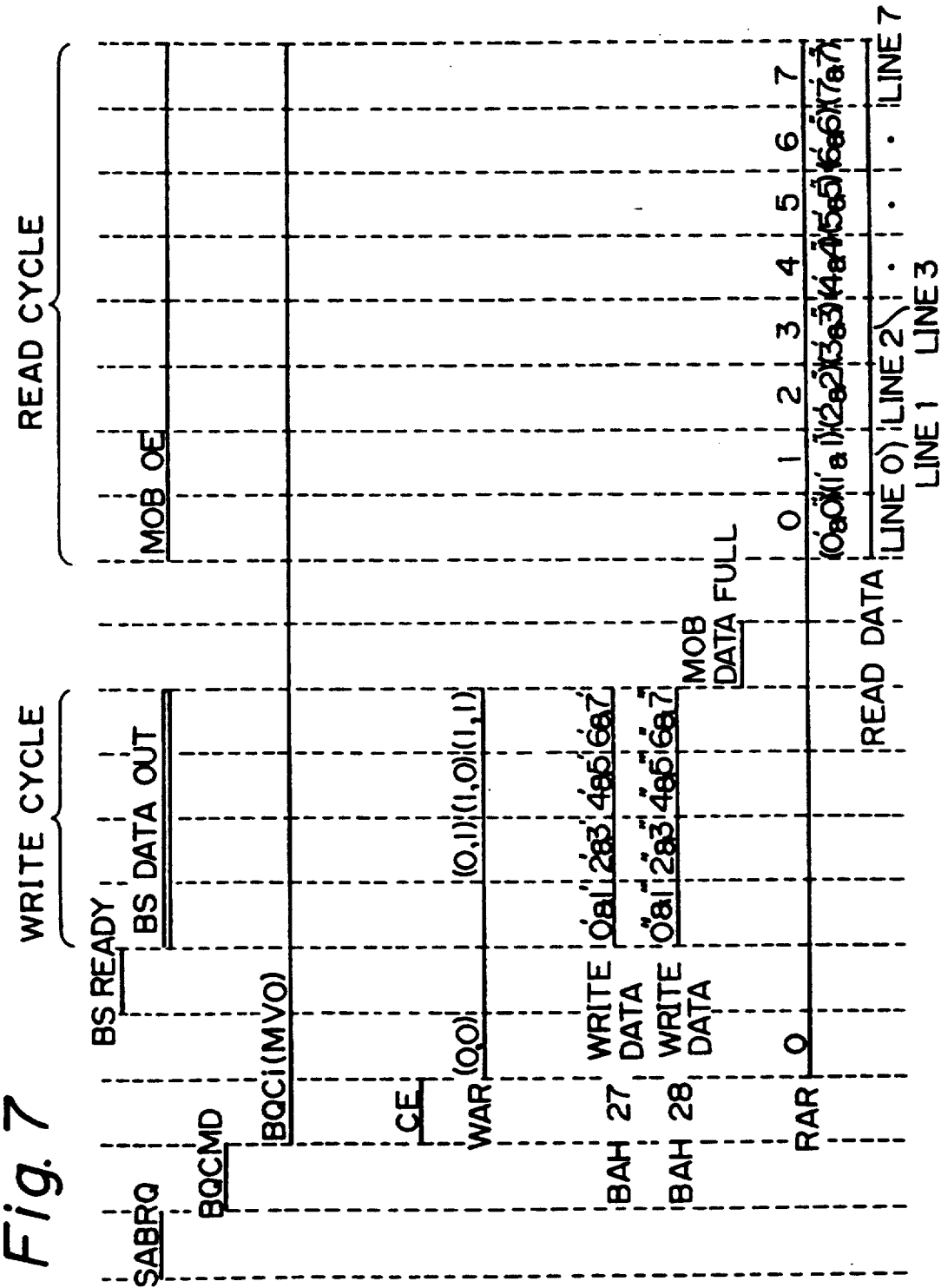
FIG. 7 is a timing diagram illustrating the timing of a move-out operation in the second embodiment of the present invention.

FIG. 7 shows the timing of a move-out operation in the second embodiment of the present invention.

First, the buffer storage controller 24 outputs an SA bus request signal SABRQ on the storage access bus 33. The SA bus request signal SABRQ indicates that a command will be output on the storage access bus 33 in the next cycle. In the next cycle, a BQ command BQCMD is output on the storage access bus 33. The BQ command BQCMD indicates a beginning of a move-out operation.

Next, a control signal BQCi becomes active which indicates that the above BQ command BQCMD is held in registers in the bus adapter H 27 and the bus adapter L 28. Although the registers which hold the BQ command BQCMD are not shown, they are provided in the decoder 40 shown in FIG. 5. At the same cycle, a chip enable signal is output to the move-out buffer memories 57 in both the bus adapter H 27 and the bus adapter L 28.

In the next cycle, the write address register 54 begins to output an initial value of the write address (0,0) (in binary notation), i.e., the write address values applied to the two address input ports of each of the move-out buffer memories 57, are each "0" and "1". In addition, the read address register 56 begins to output an initial value of the write address "0".

When the buffer storage side becomes ready to transfer a block data required to be moved-out, the buffer storage controller 24 outputs a BS READY signal on the storage access bus 33, and, in the next cycle, the transfer of the block data from the I-buffer storage 25 and the O-buffer storage 26 to the move-out buffer memory 57 begins as explained before with reference to FIG. 6.

Namely, in the first cycle of the data transfer, the data portion 0' corresponding to the 0th to the 3rd bytes in the 0th line stored in the I-buffer storage 25, and the data portion 1' corresponding to the 0th to the 3rd bytes in 1st line stored in the O-buffer storage 26 are respectively and simultaneously transferred to the 0th and 1st entries (each having a width of four bytes) of the move-out buffer memory 57 in the bus adapter H 27; and the data portion 0" corresponding to the 4th to the 7th bytes in 0th line stored in the I-buffer storage 25, and the data portion 1" corresponding to the 4th to the 7th bytes in 1st line stored in the O-buffer storage 26 are respectively and simultaneously transferred to the 0th and 1st entries (each having a width of four bytes) of the move-out buffer memory 57 in the bus adapter L 28.

After the above first cycle of the data transfer, the write address register 54 is renewed to (0,1) (in binary notation), i.e., the write addresses applied to both the move-out buffer memory 57 are each incremented by two.

In the second cycle of the data transfer, the data portion 2' corresponding to the 0th to the 3rd bytes in 2nd line stored in the I-buffer storage 25, and the data portion 3' corresponding to the 0th to the 3rd bytes in 3rd line stored in the O-buffer storage 26 are respectively and simultaneously transferred to the 2nd and 3rd entries (each having a width of four bytes) of the move-out buffer memory 57 in the bus adapter H 27; and the data portion 2" corresponding to the 4th to the 7th bytes in 2nd line stored in the I-buffer storage 25, and the data portion 3" corresponding to the 4th to the 7th bytes in 3rd line stored in the O-buffer storage 26 are respectively and simultaneously transferred to the 2nd and 3rd entries (each having a width of four bytes) of the move-out buffer memory 57 in the bus adapter L 28.

After the above second cycle of the data transfer, the write address register 54 is renewed to (1,0) (in binary notation), i.e., the write addresses applied to the move-out buffer memory 57 are each again incremented by two.

In the third cycle of the data transfer, the data portion 4' corresponding to the 0th to the 3rd bytes in 4th line stored in the I-buffer storage 25, and the data portion 5' corresponding to the 0th to the 3rd bytes in 5th line stored in the O-buffer storage 26 are respectively and simultaneously transferred to the 4th and 5th entries (each having a width of four bytes) of the move-out buffer memory 57 in the bus adapter H 27; and the data portion 4" corresponding to the 4th to the 7th bytes in 4th line stored in the I-buffer storage 25, and the data portion 5" corresponding to the 4th to the 7th bytes in 5th line stored in the O-buffer storage 26 are respectively and simultaneously transferred to the 4th and 5th entries (each having a width of four bytes) of the move-out buffer memory 57 in the bus adapter L 28.

After the above third cycle of the data transfer, the write address register 54 is renewed to (1,1) (in binary notation), i.e., the write addresses applied to the move-out buffer memory 57 are each again incremented by two.

In the fourth cycle of the data transfer, the data portion 6' corresponding to the 0th to the 3rd bytes in 6th line stored in the I-buffer storage 25, and the data portion 7' corresponding to the 0th to the 3rd bytes in 7th line stored in the O-buffer storage 26 are respectively and simultaneously transferred to the 6th and 7th entries (each having a width of four bytes) of the move-out buffer memory 57 in the bus adapter H 27; and the data portion 4" corresponding to the 4th to the 7th bytes in 6th line stored in the I-buffer storage 25, and the data portion 7" corresponding to the 4th to the 7th bytes in 7th line stored in the O-buffer storage 26 are respectively and simultaneously transferred to the 6th and 7th entries (each having a width of four bytes) of the move-out buffer memory 57 in the bus adapter L 28.

When the above four cycles of the data transfer operation are completed, the bus adapter H 27 and the bus adapter L 28 output an MOBDATAFULL signal on the storage access bus 33, and thus, the buffer storage controller 24 recognizes the completion of the write cycles of the move-out operation. Thus, the instruction processing controller 22 can access the l-buffer storage 25 or the O-buffer storage 26.

After the above operation, the buffer storage controller 24 outputs an MOB output enable signal MOB $\overline{OE}$ which enables the move-out buffer memories 57 to output their contents to the main storage 29.

Receiving the above MOB output enable signal MOB $\overline{OE}$, the move-out buffer memories 57 each start a cyclic transfer operation, i.e., the move-out buffer memory 57 in the bus adapter H 27 transfers the data k' (k=0 to 7) in a corresponding one of its eight entries in each cycle to the main storage 29, and the bus adapter L 28 transfers the data k" (k=0 to 7) in a corresponding one of its eight entries in each cycle to the main storage 29. During the above cyclic transfer operation, the output of the read address register 56 of the read address register 56 is incremented by one every time one cycle of the data transfer is completed. When the output reaches the maximum value 7, it is recognized that the whole operation of the move-out of the block data is completed.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

We claim:

1. A buffer storage system provided between a main storage and an instruction executing portion, the instruction executing portion fetching data consisting of instructions and operands and executing the instructions, said buffer storage system comprising:
   a plurality of buffer storage units each storing the data consisting of the instructions and the operands, the data stored in each of the plurality of buffer storage units being identical;
   move-out buffer register means, provided between said plurality of buffer storage units and the main storage; and
   buffer storage control means, coupled to said plurality of buffer storage units and said move-out buffer register means, for controlling transfer of a part of the data required to be moved out from each of said plurality of buffer storage units to a corresponding portion of said move-out buffer register means, and then controlling transfer of the data from said move-out buffer register means to the main storage, when the data held in said buffer storage units is required to be moved out to the main storage,
   the transfer of the parts of the data from said plurality of buffer storage units to the corresponding portions of said move-out buffer register means being concurrently carried out, and the parts of the data concurrently transferred from all of said buffer storage units constituting the whole of the data required to be moved out.

2. A buffer storage system according to claim 1, wherein said move-out buffer register means contains a plurality of move-out buffer registers each for transferring one of the parts of the data from said buffer storage units to the main storage.

3. A buffer storage system according to claim 1, wherein said move-out buffer register means includes a plurality of concurrently writable data input ports.

4. A buffer storage system according to claim 1, wherein the part of the data corresponds to 1/n of the data required to be moved out, where the number of said buffer storage units is a positive integer equal to n.

5. A buffer storage system according to claim 1, wherein the data stored in one of said plurality of buffer storage units corresponds to the data stored in at least one other of said plurality of buffer storage units.

6. A buffer storage system provided between a main storage and an instruction executing portion, the instruction executing portion fetching data consisting of instructions and operands and executing the instructions, said buffer storage system comprising:
   first and second buffer storage means for storing the data in both the first and second buffer storage means, the data stored in each of said first and second buffer storage means being identical; and
   move-out buffer register means, provided between said main storage and said first and second buffer storage means, for transferring half of the data required to be moved out from each of said first and second buffer storage means to a corresponding portion of said move-out buffer register means, and then transferring the data from said move-out buffer register means to the main storage, when the data held in said first and second buffer storage means is required to be moved out to the main storage,
   the transfer of the half of the data respectively from said first and second buffer storage means to the corresponding portions of said move-out buffer register means being concurrently carried out, and the parts of the data concurrently transferred from said first and second buffer storage means constituting the whole of the data required to be moved out.

7. A buffer storage system according to claim 6, wherein said move-out buffer register means includes first and second move-out buffer registers each for transferring half of the data from said first and second buffer storage units, respectively, to the main storage.

8. A buffer storage system for moving data from a plurality of buffer storage units to a main storage, said buffer storage system comprising:
   a plurality of buffer storage units each storing the data, the data stored in each of said plurality of buffer storage units being identical;
   move-out buffer register means, operatively connected to the main storage and said plurality of buffer storage units, for storing the data transferred in portions from said plurality of buffer storage units; and
   control means for concurrently transferring a different portion of the data from each of the buffer storage units to said move-out buffer register means and for transferring the data stored in said move-out buffer register means to the main storage.

9. A buffer storage system according to claim 8, wherein each portion of the data corresponds to $1/n^{th}$ of the data, where n is a positive integer of at least two representing the number of said plurality of buffer storage units.

10. A buffer storage system according to claim 9, wherein said move-out buffer register means has n storage elements, and each storage element concurrently receives and stores $1/n^{th}$ of the data from a corresponding one of said plurality of buffer storage units.

11. A method for moving data from a plurality of buffer storage units to at least one move-out buffer register and then to a main storage, said method comprising the steps of:
   (a) storing the data in each of the plurality of buffer storage units, the data in each of the plurality of buffer storage units being identical;
   (b) concurrently transferring a portion of the data from each of the plurality of buffer storage units to the move-out buffer register, the portion of the data transferred from each of the buffer storage units differs in content from the portion of data transferred by the other buffer storage units; and
   (c) transferring the data from the move-out buffer register to the main storage.

12. A method according to claim 11, wherein said method further comprises the step of (d) receiving an instruction requesting movement of the data in the buffer storage units to the main storage.

13. A method according to claim 11, wherein the portion of the data corresponds to $1/n^{th}$ of the data, where n is a positive integer of at least two representing the number of buffer storage units.

* * * * *